United States Patent Office 3,163,981
Patented Jan. 5, 1965

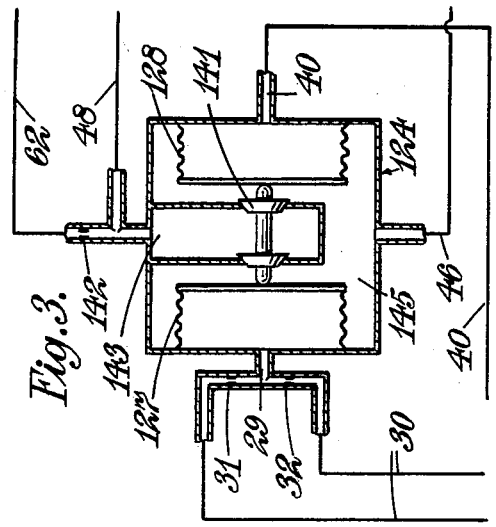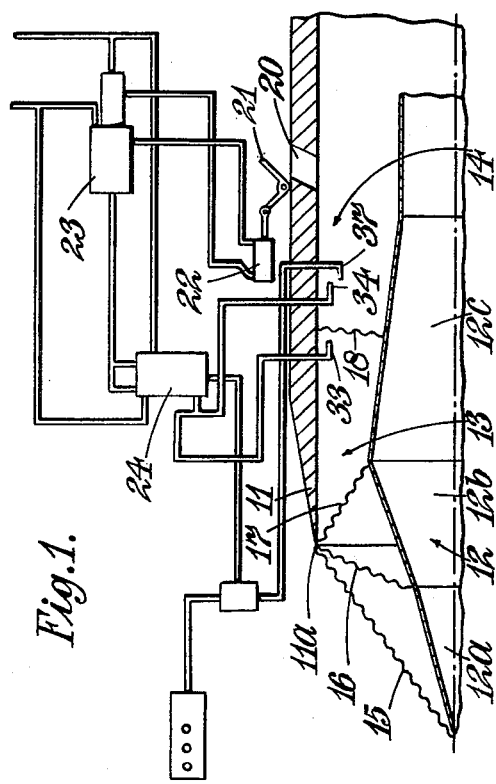

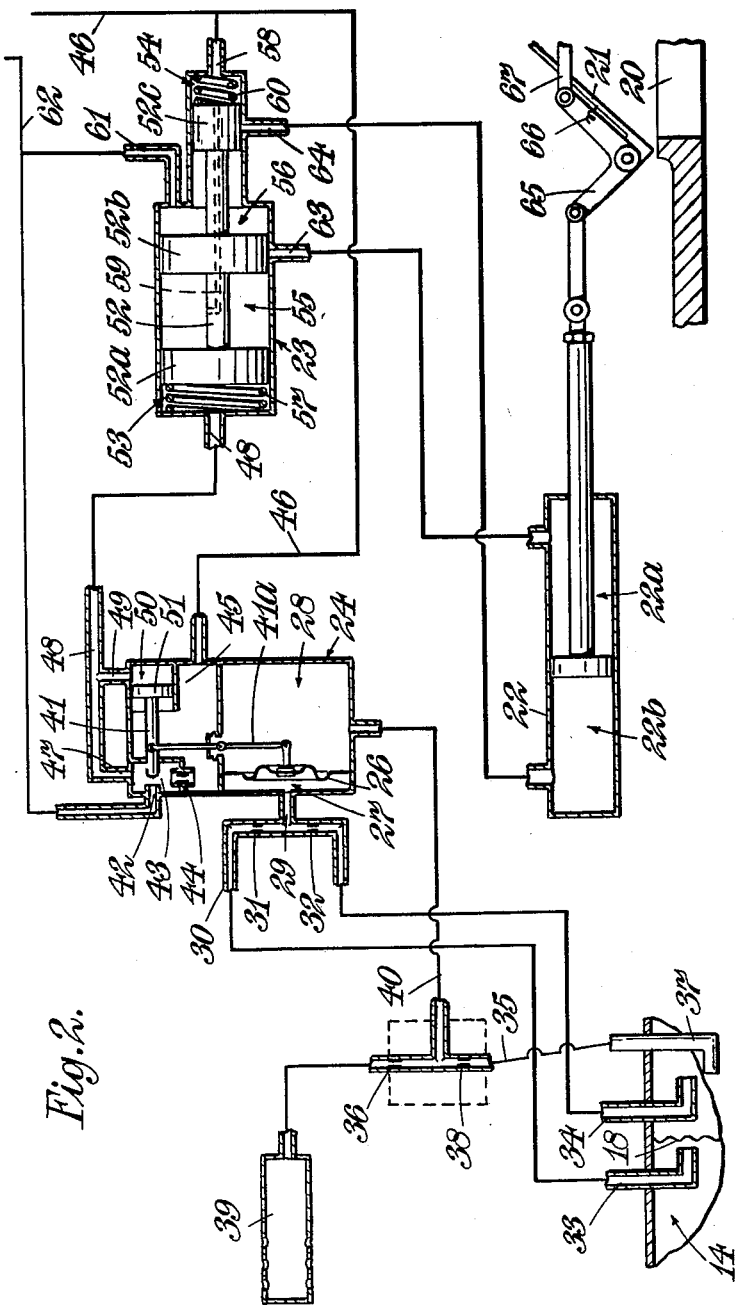

3,163,981
INTERNAL SHOCK WAVE POSITIONING CONTROL SYSTEM FOR AIR INTAKES FOR SUPERSONIC AIRCRAFT
Donald George Goodall, Hucknall, Norman George Hatton, Mapperley, and Norman Roberts, Hucknall, England, assignors to Rolls-Royce Limited, Derby, England, a British company
Filed Jan. 24, 1961, Ser. No. 84,552
Claims priority, application Great Britain, Jan. 26, 1960, 2,873/60
9 Claims. (Cl. 60—35.6)

This invention comprises improvements in or relating to air intakes for power plant of aircraft designed for flight at supersonic speeds and more particularly to such intakes in which shock compression occurs both externally of and internally of the intake.

Such an intake is subjected to operational difficulties due to the fact that the flow in the intake is unstable. One such difficulty is that, on disturbance of the flow conditions, the final shock wave in the flow internally of the intake may be displaced upstream and ultimately pass outside the intake.

According to the invention, a supersonic intake with which there is both external and internal shock compression, is provided with a bleed vent from a portion of the intake duct in which the flow is sub-sonic and means to control the bleed through the vent in a manner to maintain the desired position of the final shock wave during supersonic flight. If the final shock wave travels upstream from the desired position the bleed vent is opened up and if the final shock wave travels downstream from the desired position the vent is closed down. Thus the final shock wave tends to be maintained in a desirable position and the possibility that the final shock wave is displaced outside the intake is eliminated.

According to a preferred feature of the present invention, the bleed vent is controlled by a vent valve member which is actuated by a mechanism which acts rapidly in the sense to open the vent and acts less rapidly in the sense of closing the vent. For instance, the vent valve member may be moved by a ram, and the difference in the rates of opening and closing the valve member may be achieved by arranging that when the valve member is being closed a restriction is introduced into the flow path conveying fluid from the ram. Also where the ram piston is of the differential area kind it is preferably arranged that pressure fluid is fed to the smaller area side of the piston when opening the bleed vent, so that a smaller volume of fluid is required to effect a given travel of the ram piston than is required to obtain the same travel when closing the bleed vent.

According to one arrangement, the means controlling the vent includes sensing means which senses the position of the final shock wave and provides a signal initiating operation of the vent when the final shock wave moves from the desired position. For instance, the sensing means may comprise a pair of pressure tapping probes arranged in the intake duct at the limits of permissible movement of the final shock wave, the pressures sensed by the probes being employed to derive a signal which is indicative of the final shock wave position and is used to initiate operation of the vent valve.

One construction of supersonic intake for the power plant of an aircraft designed for supersonic flight will now be described with reference to the accompanying drawings in which:

FIGURE 1 shows diagrammatically part of the intake and the control means,
FIGURE 2 shows the control means in more detail, and
FIGURE 3 shows an alternative form for part of the control means.

The air intake shown is of the annular kind and comprises an outer annular wall 11, which terminates at its upstream end in a leading edge lip 11a, and a centre body 12. The centre body 12 comprises an apex portion 12a which is divergent in the direction of air flow and which is wholly upstream of the lip 11a, also comprises an intermediate portion 12b which extends rearwardly from the portion 12a to within the outer wall 11, this portion 12b diverging rearwardly with a greater divergence than the portion 12a and defining (at its downstream end) with the wall 11 a throat 13 at a position downstream of the lip 11a, and also comprises a convergent downstream portion 12c wholly within the outer wall 11 and forming a diffuser passage 14 with the wall 11.

In the case where the intake is annular the parts 12a, 12b, 12c, are conical and may be displaceable lengthwise, so that the intake may be varied for different flight conditions.

The intake just described is of the kind in which, in supersonic flight above about Mach 1.4, shock compression occurs not only externally of the intake as at shock waves 15, 16, but also shock compression occurs internally of the intake as at shock waves 17, 18, the flow downstream of the final shock wave 18 being subsonic. Such an intake has a better performance than intakes designed to give wholly external shock compression, since it has a higher pressure recovery and a lower drag and the improvement is more marked as the design Mach number is increased.

It is desirable in such supersonic operation to control the position of the final shock, the shock wave 18 in the drawing, and to do this there is provided a bleed vent 20 from the duct 14 downstream of the final shock wave 18 and means to vary the flow through the bleed vent 20 to ensure that the final shock 18 maintains a desired position. By opening the bleed vent 20 the final shock wave 18 is caused to travel downstream and by closing the vent 20 the shock wave 18 is caused to travel upstream.

The bleed vent 20 is shown as being controlled by a vent valve member 21 and a control system for the valve member 21 is also shown.

The vent valve member 21 (FIGURES 1 and 2) is shown as a pivoted flap operated by a ram 22 fed with operating fluid under control of a control valve-mechanism 23 which in turn is controlled by sensing means 24 sensitive to the position of the final shock wave 18.

The sensing means 24 sensitive to the shock wave position comprises a flexible diaphragm 26 separating two chambers 27, 28. The chamber 27 is connected by pipe 29 to a point in a pipe 30 between two restrictors 31, 32, the ends of the pipe 30 being connected to two pressure sensing probes 33, 34. The probes 33, 34 have orifices facing downstream in the intake duct 14 at axially-spaced positions corresponding to the limits of permissible travel of the final shock wave 18 in the duct 14. The probe 33 is thus upstream of the final shock wave 18 and the probe 34 is downstream of it and the pressure between the restrictors 31, 32, has a value intermediate the pressures sensed by the probes.

The chamber 28 is at a reference pressure determined by a restrictor arrangement housed in a conduit 35 joining a probe 37 facing forwardly in the duct 14 in the region of the probes 33, 34 and an atmospheric pressure senser 39, the chamber 28 being joined by connection 40 to conduit 35 between the ends of the restrictor arrangement. The restrictor arrangement is shown as comprising two restrictors 36, 38 and is such that the reference pressure is always between the pressures sensed by the probes 33, 34 when the final shock 18 is in the desired position. Other arrangements for obtaining the reference pressure may be used, for instance due to the difference in pressures sensed by the devices 37, 39 it may be necessary to have more than two restrictors in series.

The diaphragm 26 operates a lever 41a pivoted in a fixed wall of the chamber 28 and carrying a flow control valve member 41 which co-operates with a pressure liquid inlet 42 to a chamber 43. The chamber 43 has a restricted outlet 44 to a chamber 45 leading to a low pressure conduit 46 and also has a free outlet 47 to a conduit 48 leading to the control valve mechanism 23. The conduit 48 has a branch 49 leading to a chamber 50 bounded in part by a piston 51 connected to the valve member 41 so that the valve member 41 is loaded to closure by a load dependent on the pressure in chamber 50.

The loads acting on lever 41a are dependent on the pressure in chambers 27, 28 and on the hydraulic load on the piston 51 which load is dependent on the pressures in the chambers 43, 45, and under steady conditions the loads on lever 41a balance and a controlled pressure is obtained in chamber 43 which depends upon the pressure in chamber 27. The pressure in chamber 27 is dependent on the position of the final shock wave 18. Thus, if the shock wave 18 moves to a position upstream of probe 33, the pressure between restrictors 31, 32 and in chamber 27 increases so closing down the valve member 41 on the inlet 42 and reducing the pressure in chamber 43. Conversely, if the shock wave 18 moves downstream of the probe 34, the pressure in chamber 27 falls so moving the valve member 41 away from inlet 42 and causing an increase in the pressure in chamber 43. The piston 51 acts to give a negative feed back to reduce hunting.

The control valve mechanism 23 for controlling the supply of operating fluid to the ram 22 comprises a piston valve 52 having three lands 52a, 52b, 52c, of which land 52c has a smaller pressure-loaded area than the other lands 52a, 52b. The valve mechanism is thus divided into end chambers 53, 54 and intermediate chambers 55, 56. Chamber 53 has conduit 48 opening into it and houses a compression spring 57; chamber 54 is connected by pipe 58 to the low pressure conduit 46 and by restrictive drilling 59 to chamber 55, and houses a counter-spring 60; and chamber 56 is connected by pipe 61 to a high pressure liquid supply conduit 62 which also supplies the means 24 through inlet 42. The mechanism 23 also has connections 63, 64 leading to pressure spaces 22a, 22b of the ram 22, the connection 63 being covered by land 52b when the piston valve 52 is in its neutral position and connection 64 being covered by land 52c. The lands 52b, 52c are axially substantially wider than the ports leading to the connections 63, 64 so that a substantial change of pressure is required in chamber 53 before the piston valve 52 moves sufficiently to uncover the ends of the connections 63, 64.

The operation of the control is as follows:

When the intake is operating normally, the final shock wave 18 is at a position between the probes 33, 34 and the loads acting on the diaphragm 26 and piston 51 are such that the valve member 41 is in a position producing a pressure in conduit 48 such that the piston valve 52 is covering the ends of connections 63, 64 and the ram 22 is locked.

If now the pressure in duct 14 downstream of the final shock wave 18 should increase undesirably and cause displacement of the shock wave 18 upstream of the probe 33 the means 24 operates as described above to reduce the pressure in chamber 43 and thus in chamber 53, so that the loads on the piston valve 52 becomes unbalanced and it moves to the left (as seen in FIGURE 2) connecting the pressure liquid supply pipe 61 via chamber 56 and connection 63 to space 22a and connecting the low pressure conduit 46 through chamber 54 and connection 64 to space 22b, so causing the piston 22c of ram 22 to move rapidly to the left, the flow into space 22a and from space 22b being unrestricted and the volume of space 22a being small in relation to space 22b. Consequently the flap 21 is rocked rapidly to open up the bleed vent 20. This allows rapid bleed off of air from the duct 14 so causing the final shock wave 18 to move downstream until it passes probe 33 and when the pressure in chamber 27 falls so causing an increase in pressure in chambers 43, 53 which in turn causes the piston valve 52 to move to the right to a position covering the ends of the connections 63, 64 and locking the ram 22.

Due to the rapid opening of the bleed vent 20, the final shock wave 18 may travel so rapidly in the downstream direction as to overshoot the probe 34 and in this case the control will operate to move piston valve 52 to the right so admitting pressure fluid to ram space 22b causing movement of the piston 22c to slowly close the flap 21 thus slowly bringing the final shock wave 18 back past the probe 34. The piston 22c moves slowly because the fluid leaving space 22a must flow through the restricted drilling 59 and because the volume of pressure liquid required to move the piston 22c is large.

If whilst the final shock wave 18 is between the probes 33, 34 the conditions in the duct 14 change so that the final shock wave 18 moves downstream of the probe 34, the control for the flap 21 will operate slowly to close the flap 21 down on the bleed vent 20 so reducing the flow from the duct 14 and causing the final shock wave 18 to move slowly back to its position between the probes 33, 34.

The pressure liquid employed for operating the ram 22 is conveniently obtained from the hydraulic system of the aircraft, rather than from say the fuel or lubricating systems of the aircraft engines, since in a multi-engined aircraft pressure liquid will be available even on failure of an engine.

There may be more than one bleed vent 20 and in this case their associated flaps 21 may be interconnected for operation by the ram 22 as indicated in FIGURE 2. Each flap 21 is pivoted to the elbow of an associated bell-crank 65 and is loaded by a spring 66 to lie against one arm of the bell crank, and the bell-cranks 65 are interconnected by links 67.

An alternative form of the means responding to the position of shock wave 18 is shown in FIGURE 3. The means 124 comprises pressure responsive flexible capsules 127, 128 subjected internally respectively to pressures derived from the pipes 29 and 40, a chamber 145 connected to low pressure conduit 46, a chamber 143 connected to the high-pressure conduit 62 through a fixed restrictor 142 and a valve 141 connecting the chambers 143, 145. The valve 141 is operated by the capsules 127, 128. When the pressure in capsule 127 increases, valve 141 is opened so reducing the pressure in chamber 143 (and thus in chamber 53 of the valve mechanism 23) and conversely when the pressure in capsule 127 decreases valve 141 closes down so causing an increase in pressure in chamber 143.

The bleed vent 20 may open overboard or be connected to ducts leading to a discharge at a backward facing aircraft surface or to an aerodynamic nozzle, or may be divided between these.

By suitable adjustment of the restrictor arrangement 36, 38 the bleed vent may be opened during ground running of the engines and during take-off so as to act as an auxiliary air intake. It would be closed again when the aircraft reaches a predetermined forward speed, said predetermined forward speed being less than supersonic speed.

Instead of employing a flap 21 to control the bleed vent 20, other forms of valve, such as a slide valve, may be used. Alternatively, the control system may be caused to vary the configuration of the centre body in order to control the mass flow through the intake.

The control arrangement is not only applicable to annular intakes as specifically described, but is also applicable to single slot intakes in which case parts 12a, 12b, 12c, will be ramps mounted on say the aircraft fuselage, and to double slot intakes in which case the parts 12a, 12b, 12c, will be double ramps.

We claim:

1. A supersonic intake for aircraft power plant, said intake being of the class in which there is both external and internal shock compression and comprising an intake duct within which a final shock wave occurs and means maintaining the desired position of said final shock wave within the intake duct comprising a bleed vent from said intake duct at a position downstream from said final shock wave, a vent valve member cooperating with said bleed vent to vary its outlet area, a ram connected to move said valve member, a pressure fluid supply connectible alternately to each end of said ram, a fluid outlet path from said ram, a restrictor connectible in said fluid outlet, a valve mechanism which operates to connect said restrictor in said fluid outlet only when said ram moves said valve member in the sense of reducing the outlet area of the bleed vent, and means sensing the position of the final shock wave and producing a signal pressure which increases if said final shock wave moves upstream from its desired position and which decreases if said shock wave moves downstream from its desired position, said valve mechanism comprising a cylinder with a piston valve movable therein, said piston valve having three lands defining the said cylinder two end chambers an two intermediate chambers, one end chamber being open to said signal pressure and a return conduit containing fluid at low pressure to which the other end chamber is open, said restrictor comprising a restrictive drilling connecting the intermediate chamber which is next to the one end chamber to said other end chamber, the intermediate chamber next to said other end chamber being open to said pressure fluid supply; spring means loading said piston valve to a neutral position; a first outlet connected to the smaller area side of said ram piston, which outlet is covered in the neutral position of the piston valve by the land separating said intermediate chambers, and a second outlet connected to the larger area side of said ram piston and covered in the neutral position of said piston valve by the land which separates said other end chamber from the intermediate chamber next to it, which land has a smaller width than the other two lands, so that, when the final shock wave moves downstream from its desired position said smaller area side of the ram piston is connected to said return conduit through said restrictive drilling, whereby slow closing of the vent valve is effected.

2. A supersonic intake for aircraft power plant, said intake being of the class in which there is both external and internal shock compression and comprising an intake duct within which a final shock wave occurs and means maintaining the desired position of said final shock wave within the intake duct comprising a bleed vent from said intake duct at a position downstream from said final shock wave, a vent valve member cooperating with said bleed vent to vary its outlet area, a ram connected to move said valve member, a pressure fluid supply connectible alternately to each end of said ram, a fluid outlet path from said ram, a restrictor connectible in said fluid outlet, a valve mechanism which operates to connect said restrictor in said fluid outlet only when said ram moves said valve member in the sense of reducing the outlet area of the bleed vent, means sensing the position of the final shock wave comprising a pair of pressure tapping probes situated within the intake duct at the limits of permissible movement of said final shock wave, a conduit connecting said probes, a pair of restrictors in series in said conduit, and a pressure-responsive device connected into said conduit between said pair of restrictors, a return conduit containing fluid at low pressure, a flow valve member and a flow restrictor connected in series between said pressure fluid supply and said return conduit, a pressure fluid conduit connecting said valve mechanism to said pressure fluid supply through said flow valve member, said pressure-responsive device actuating said flow valve member and thereby controlling the pressure in said pressure fluid conduit to adjust the said valve mechanism and thus to control operation of the vent valve.

3. A supersonic intake according to claim 2 comprising also means producing a reference pressure which has a value between the pressures sensed by said pressure tapping probes when the final shock is in its desired position, said pressure-responsive device being also loaded by said reference pressure in opposition to the pressure between said pair of restrictors.

4. A supersonic intake according to claim 2, said pressure-responsive device including negative feed back means connected to load said flow valve member in the same sense as the pressure in said first conduit between said first pair of restrictors.

5. A supersonic intake for aircraft power plant, said intake being of the class in which there is both external and internal shock compression and comprising an intake duct within which a final shock wave occurs and means maintaining the desired position of said final shock wave within the intake duct comprising a bleed vent from said intake duct at a position downstream from said final shock wave, a vent valve member cooperating with said bleed vent to vary its outlet area, a ram connected to move said valve member, a pressure fluid supply connectible alternately to each end of said cam, a fluid outlet path from said ram, a restrictor connectible in said fluid outlet, a valve mechanism which operates to connect said restrictor in said fluid outlet only when said ram moves said valve member in the sense of reducing the outlet area of the bleed vent, a pair of pressure tapping probes situated within the intake duct at the limits of permissible movement of said final shock wave, a first conduit connecting said probes, a first pair of restrictors in series in said first conduit, a pressure-responsive device open to said first conduit between said first pair of restrictors therein, an atmospheric probe, a third probe facing upstream within the intake duct in the region of said pair of pressure tapping probes, a second conduit connecting said atmospheric probe and said third probe, a second pair of restrictors in series in said second conduit such that the pressure in said second conduit between said second pair of restrictors has a value between the pressures sensed by said pressure tapping probes when said final shock wave is in its desired position, said pressure in said second conduit between said second pair of restrictors loading said pressure responsive device in opposition to the pressure in said first conduit between said first pair of restrictors, a return conduit containing fluid at low pressure, a flow valve member and a flow restrictor connected in series in the flow path between said pressure fluid supply and said return conduit, a pressure fluid conduit connecting said valve mechanism to said pressure fluid supply through said flow valve member, said pressure-responsive device actuating said flow valve member and thereby controlling the pressure in said pressure fluid conduit to adjust the said valve mechanism and thus to control operation of the vent valve.

6. A supersonic intake according to claim 5 wherein the pressure-responsive device comprises a flexible diaphragm loaded on a surface by the pressure in said first conduit between said first pair of restrictors and on its other surface by the pressure in said second conduit between said second pair of restrictors, and a lever loaded by the diaphragm and actuating said flow valve member.

7. A supersonic intake according to claim 5 wherein said pressure-responsive device comprises a pair of flexible capsules, one subjected internally to the pressure in said first conduit between said first pair of restrictors and the other to the pressure in said second conduit between said second pair of restrictors, the capsules acting directly on said flow valve member.

8. A supersonic intake for aircraft power plant, said intake being of the class in which there is both external and internal shock compression and comprising an intake duct within which a final shock wave occurs and means maintaining the desired position of said final shock wave within the intake duct comprising a bleed vent from said intake duct at a position downstream from said final shock wave, a vent valve member cooperating with said bleed vent to vary its outlet area, a ram connected to move said valve member, a pressure fluid supply connectible alternately to each end of said ram, a fluid outlet path from said ram, a restrictor connectible in said fluid outlet, a valve mechanism which operates to connect said restrictor in said fluid outlet only when said ram moves said valve member in the sense of reducing the outlet area of the bleed vent, a pair of pressure tapping probes situated within the intake duct at the limits of permissible movement of said final shock wave, a conduit connecting said probes, a pair of restrictors in series in said conduit, a pressure-responsive device connected into said conduit between said pair of restrictors, a return conduit containing fluid at low pressure, a pressure fluid conduit connecting said valve mechanism to said pressure fluid supply through said flow valve member, said pressure-responsive device actuating said flow valve member and thereby controlling the pressure in said pressure fluid conduit to adjust the said valve mechanism and thus to control operation of the vent valve, and further including negative feed back means comprising a piston integral with said flow valve member, said piston being loaded on one side by the pressure in said pressure fluid conduit and on the other side by the pressure in said return conduit.

9. A supersonic intake for aircraft power plant, said intake being of the class in which there is both external and internal shock compression and comprising an intake duct within which a final shock wave occurs and means maintaining the desired position of said final shock wave within the intake duct comprising a bleed vent from said intake duct at a position downstream from said final shock wave, a vent valve member cooperating with said bleed vent to vary its outlet area, a ram connected to move said valve member, a pressure fluid supply and a return conduit, a valve mechanism controlling the said pressure fluid supply, and means sensing the position of the final shock wave and producing a signal pressure which increases if said final shock wave moves upstream from its desired position and which decreases if said shock wave moves downstream from its desired position, said valve mechanism including a restrictive fluid outlet path and having a neutral setting and two operative settings, the valve mechanism in the one operative setting connecting the pressure fluid supply to the smaller area side of the ram piston and the return conduit to the larger area side of the ram piston and in the other operative setting connecting the pressure fluid supply to the larger area side of the ram piston and the return conduit to the smaller area side of the ram piston through the restrictive fluid outlet path, and means moving the valve mechanism to its one operative setting when the said signal pressure increases and moving the valve mechanism to its other operative setting when the said signal pressure decreases, whereby the vent valve is closed at a slower rate than it is opened.

References Cited by the Examiner
UNITED STATES PATENTS

| | | | |
|---|---|---|---|
| 641,132 | 1/00 | Moore | 121—189 |
| 2,169,470 | 8/39 | Miller et al. | 91—443 X |
| 2,551,470 | 5/51 | Smith | 60—35.6 |
| 2,737,019 | 3/56 | Billman | 60—35.6 |
| 2,751,822 | 6/56 | Schiltz. | |
| 2,850,871 | 9/58 | Drake | 60—35.6 |
| 2,852,965 | 9/58 | Wallace. | |
| 2,910,084 | 10/59 | Frantz | 137—85 |
| 2,969,939 | 1/61 | Sulkin et al. | 60—35.6 X |
| 2,985,142 | 5/61 | Aiken. | |
| 3,029,600 | 4/62 | Young | 60—35.6 |

OTHER REFERENCES

Matzdorff: "Pneumatic Inlet Control Systems," SAE Transactions, vol. 66, 1958, pages 496–514.

Wilcox: "Factors Influencing Variable Inlet Control Designs," 12 pages, preprint of paper given at the SAE National Aeronautics' Meeting, Sept. 29–Oct. 4, 1958, published by SAE Inc., 485 Lexington Avenue, New York 17, New York.

Ernst: "Oil Hydraulic Power and Its Industrial Applications." 1st edition, copyright 1949 by McGraw-Hill Book Co., Inc., pages 268 and 269.

SAMUEL LEVINE, *Primary Examiner.*

ABRAM BLUM, *Examiner.*